April 5, 1949. G. W. BURG 2,466,149
STOCK PICKUP AND CARRIER TRUCK
Filed Jan. 30, 1945 2 Sheets-Sheet 1

Inventor
George W. Burg
by M. Ramsey
Attorney

April 5, 1949.  G. W. BURG  2,466,149
STOCK PICKUP AND CARRIER TRUCK
Filed Jan. 30, 1945   2 Sheets-Sheet 2

Inventor
George W. Burg
by
Attorney

Patented Apr. 5, 1949

2,466,149

UNITED STATES PATENT OFFICE 2,466,149

STOCK PICKUP AND CARRIER TRUCK

George W. Burg, Portland, Oreg.

Application January 30, 1945, Serial No. 575,212

1 Claim. (Cl. 280—57)

The principal object of my invention is to provide a stock pick-up and carrier truck specifically adapted for handling sheets of material, although it has other function in handling other types of material. Sheets of plate, for example, normally are received in a truck or car, the sheets standing on edge. It is common practice to manually unload such sheets and arrange them in stacks on a flat-bed truck or otherwise and to transport them to a storage rack and then again to stack them on edge. With a truck embodying my invention it is possible to run said truck on to the bed of an automobile truck or railroad car and to lift the sheets on to the truck and move the loaded truck within the automobile truck or railroad car into and through a plant and then stack them in racks, all while the sheets are on edge. This may be accomplished without a great deal of manual labor because the truck is provided with nose pieces adapted to be slid under the lowermost edge of the sheets and tipped back so that they rest against the oblique face of a supporting frame. The said truck preferably is provided with four wheels which are castered so that the truck may move sidewise or endwise with equal facility. When the sheets are to be arranged in a rack, the truck may be tipped so that the sheets may be moved away from the supporting frame and stacked against the vertical supports of a rack.

Further and other details of my invention and the mode of operation thereof are hereinafter described with reference to the accompanying drawings, in which.

A hand truck embodying my invention comprises a base 1, comprising a longitudinal member 1a, two laterally disposed members 1b and 1c, respectively, joined to the ends, respectively, of said longitudinal member, and two diagonally disposed cross braces 1d and 1e, respectively. Said cross braces are joined to the free end of the lateral members and to the central portion of the longitudinal member 1a. This provides a relatively strong welded frame, of generally rectangular outline; except that the rear edge of said base has no longitudinal member 1a. This construction permits an operator to step therein without interfering with the tipping of said truck to accommodate loading and unloading thereof.

Figures 5, 6:
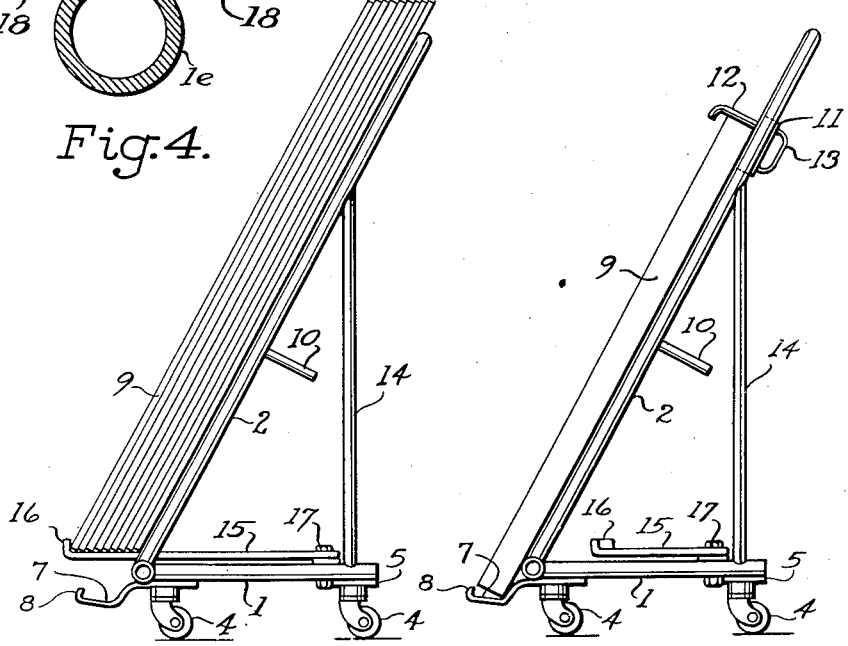
Fig. 5 is an elevation of a truck embodying my invention, in which larger sheets of less weight and greater bulk may be caried by the auxiliary supports.
Fig. 6 is an elevation of said truck illustrating the manner in which packages of metal plates, for example, may be mounted upon, locked in position and transported by a hand truck embodying my invention.

A load supporting frame is carried by said base and comprises, in the main, a U-shaped member 2, preferably provided with a central stiffening member 3. The ends of said U-shaped member 2 are joined to the ends of the longitudinal member 1a by welding or otherwise. Supporting said base are four casters 4, arranged at the four corners of said base. Two pads 5 are welded or otherwise secured to the rearwardly extending ends of the lateral members 1b and 1c. Two nose pieces 6 are secured to the other ends of said lateral members and to the ends of the longitudinal member 1a. Said nose pieces preferably are formed to define a trough 7. That is, each of said nose pieces preferably is provided with a lip 8 and the nose pieces point down slightly rearwardly of said lip, thus accommodating and retaining the lower edge of a package of plates 9. I deem it most desirable to form said nose pieces with such upturned lip. It is readily appreciated, however, that said lip could comprise more or less an obliquely upturned flat portion extending from the back of the trough to the point occupied by the tip of said lip, thus to extend more or less parallel to the lower edge of the package of plates, as is shown in Fig. 6. If the package is tightly enveloped in some type of sheath, I deem this preferable, but if said plates are loosely packaged I deem it preferable to provide nose pieces with said sharply upturned lip, because said sheets will tend to slide relatively in the manner shown in Fig. 5 in connection with the auxiliary supports.

I preferably provide a rearwardly extending handle or grip 10 on the central member 3, somewhere adjacent the vertical middle thereof. I also preferably provide a load engaging clamping member 11 on said central member. Said load engaging clamping member preferably is adjustable to slide from the position shown in Fig. 1 to an upper limit, where it comes into abutment with the under edge of the U-shaped member 2.

Said clamping member is freely rotatable about said central member, and thus, if it is to be arranged in retracted or non-engaging position, it may be arranged so that the hook 12 and the grip 13 lies substantially in the plane of the U-shaped member and its central member 3.

Figures 1, 2:
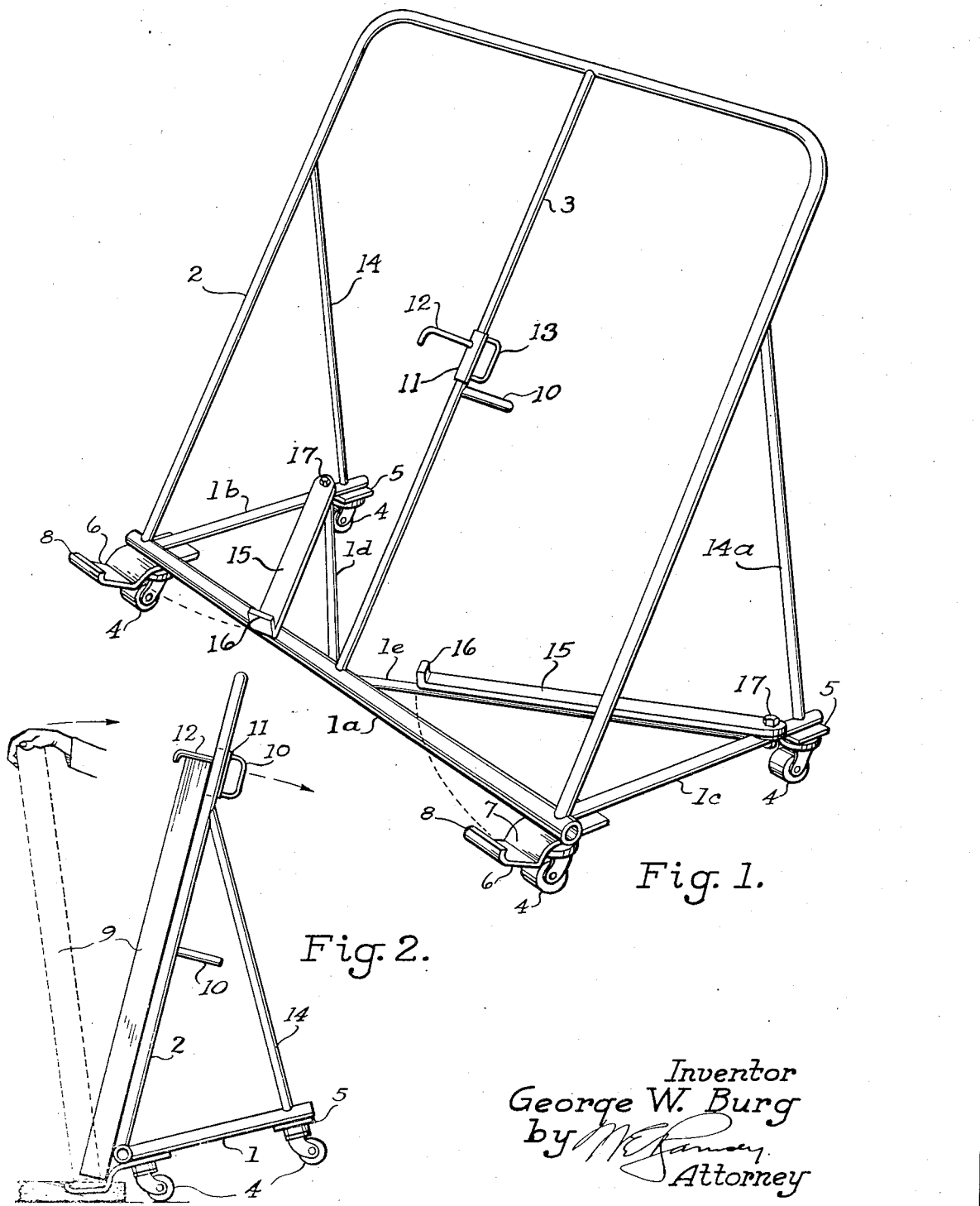
Fig. 1 is a perspective view of a truck, embodying my invention, provided with auxiliary load supporting devices which may be swung from inoperative to operative position, as is indicated in dotted lines in Fig. 1.
Fig. 2 is a side elevation of a truck embodying my invention, illustrating the manner in which packages of sheet material, such for example as steel or aluminum plates, may be picked up easily and readily and tipped back into position to be supported by said hand truck.

Supporting said U-shaped member, intermediate the ends thereof, are two vertical members or posts 14—14a. The lower end of each of said vertical members 14—14a is carried by the rearwardly extending end of a lateral member 1b or 1c, respectively, directly over or adjacent the casters on said end. The upper ends of said vertical members are welded or otherwise secured to the legs, respectively, of the U-shaped member intermediate the ends thereof. This arrangement permits the U-shaped member to be extended to a height substantially greater than that of the vertical posts to provide adequate support for sheets of material transported by said truck. The parts are arranged, however, so that the center of mass of said truck and its load lies laterally between the casters. This eliminates the necessity for providing lateral support for the truck to prevent tipping, such as is more or less standard in two-wheeled hand trucks. Thus a workman using a truck embodying my invention, after it has been loaded, has only to push and to guide it, and loads of many hundred pounds may be handled by a workman easily and efficiently. That is, said supporting member comprising a U-shaped member 2, and the central member 3, are inclined obliquely to a vertical plane and thus a load may be carried by the trough in the nose pieces and may lean back against the supporting frame without tending to fall forward or to overturn the truck. If a load is quite flexible or if the truck is used over a relatively rough surface, I deem it desirable that the load engaging clamping member 11 be arranged as is shown in Figs. 2 and 6, to hold the load tightly against the supporting frame.

Most sheets of material are transported in trucks or in railroad cars and in stock racks edgewise upon spaced planks or timbers, usually about two inches high. Thus the trucks can be tipped forwardly as is shown in Fig. 2 to slide their nose pieces under the end of a package of plates 9. Then the package may be swung back against the supporting frame and the truck pulled back until it rests upon the four casters, as is shown in Fig. 6. The package will slide down into the trough formed in the nose pieces and the load engaging clamping member may be pulled down and locked with the hook extending over and engaging the front face of said package. The load is thus held securely in position for transporting.

Figure 3:
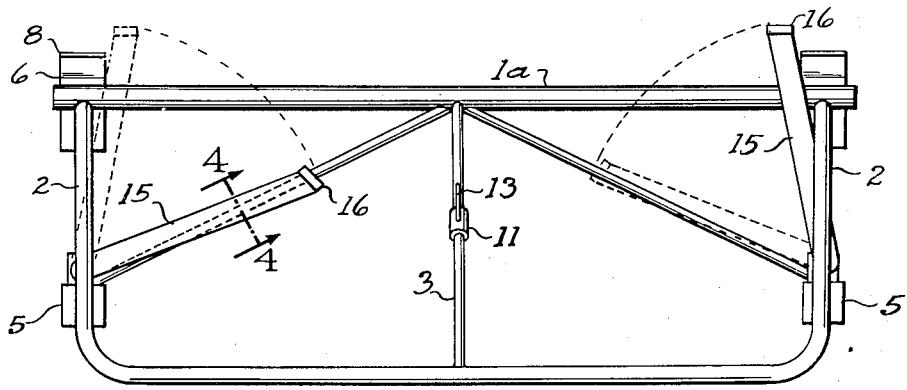
Fig. 3 is a plan view of said hand truck also illustrating the manner in which auxiliary supports may be moved from retracted to operating position, said path of movement from one position to the other being shown in dotted outline.
Figure 4:
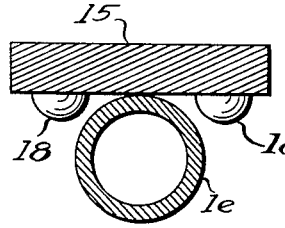
Fig. 4 is a detailed sectional view taken on the line 4—4 in Fig. 3, illustrating the manner in which the auxiliary supports are releasably held in retracted position.

When my improved truck is used for transporting a number of sheets of plywood, insulating board or similar material, which is relatively lighter and bulkier, I find that the nose pieces provided are of insufficient length to accommodate a heavy enough load. I thus provide pivotally mounted auxiliary load supporting elements 15, which may be swung from a position in alinement with the diagonally disposed cross braces, as is shown in Fig. 3, to a position where they overlie substantially, the nose pieces. The truck may be handled in a manner similar to that previously described in handling metal plates, and illustrated generally in Fig. 2, to load a number of said sheets on said auxiliary load supporting elements. Then the truck may be tipped back so that it rests upon the four casters. Each of said auxiliary load supporting elements is provided with an upturned lip 16, which engages the forward face of the outermost sheet of plywood or similar material, to prevent it slipping laterally from engagement with the auxiliary load supporting elements.

Said auxiliary load supporting elements preferably are more or less loosely journaled upon a pivot bolt 17. The under surface of said auxiliary load supporting elements has a pair of spaced protuberances 18, which may lie at opposite sides of said cross brace to prevent said auxiliary load supporting elements from swinging outwardly to the position shown in dotted outline in the left hand side of Fig. 3. They can easily be moved into position, however, by first lifting the free end carrying lip 16, and swinging them manually into position.

It is to be noted that substantially the entire weight of a load is supported by members lying immediately above the four casters. Thus, all of the framework of said truck may be made relatively light weight, because there is no substantial tendency of the load to bend or to spring them. Thus, said truck may be made of light-weight structural members, tubular stock or similar structural elements, and said hand truck has very little dead weight.

I claim:

A hand truck, comprising a horizontally disposed base having four corners, a caster for supporting said base mounted at each of the four corners thereof, a load supporting frame comprising an inverted U-shaped member supported at one edge on said base adjacent two of said casters, two vertically disposed frame members also carried by said base, said vertical members bearing at their lower ends adjacent the other two casters and joined at their upper ends, respectively, to the two upstanding legs of said U-shaped member, load engaging nose pieces extending in front of said base and below the horizontal plane thereof, a pair of pivotally mounted load supporting elements carried by said base, said elements in load supporting position extending laterally in front of said load supporting frame above said nose pieces and in retracted position lying behind said load supporting frame.

GEORGE W. BURG.

REFERENCES CITED

The following references are of record in the file of this patent:

UNITED STATES PATENTS

| Number | Name | Date |
|---|---|---|
| D. 92,125 | Eastman | May 1, 1934 |
| D. 99,074 | Eastman | Mar. 24, 1936 |
| 1,663,571 | Shedd | Mar. 27, 1928 |
| 2,030,925 | Lea | Feb. 18, 1936 |
| 2,044,363 | Morse et al. | June 16, 1936 |
| 2,133,126 | Walton, Jr. | Oct. 11, 1938 |

FOREIGN PATENTS

| Number | Country | Date |
|---|---|---|
| 106,353 | Switzerland | Sept. 16, 1924 |